(12) United States Patent
Boone, Jr.

(10) Patent No.: US 6,510,813 B1
(45) Date of Patent: Jan. 28, 2003

(54) ANIMAL FEEDER DEVICE

(76) Inventor: Archie T. Boone, Jr., 23 Durham Eubanks Rd., Pittsboro, NC (US) 27312

( * ) Notice: Subject to any disclaimer, the term of this patent is extended or adjusted under 35 U.S.C. 154(b) by 0 days.

(21) Appl. No.: 10/167,266

(22) Filed: Jun. 10, 2002

Related U.S. Application Data

(60) Provisional application No. 60/298,017, filed on Jun. 12, 2001.

(51) Int. Cl.$^7$ ................................................. A01K 5/00
(52) U.S. Cl. ................................................... 119/57.91
(58) Field of Search ........................... 119/57.91, 51.01, 119/52.1, 53, 53.5, 54, 55

(56) References Cited

U.S. PATENT DOCUMENTS

| | | | | |
|---|---|---|---|---|
| 2,974,633 A | * | 3/1961 | Whidden | 119/51.01 |
| 3,034,480 A | * | 5/1962 | French | 119/57.91 |
| 3,195,508 A | * | 7/1965 | Lehman et al. | 119/51.11 |
| 3,400,688 A | * | 9/1968 | Koinzan | 119/51.01 |
| 3,515,098 A | * | 6/1970 | Thurmond | 119/51.01 |
| 4,057,136 A | * | 11/1977 | La Porte, Jr. | 119/57.91 |
| 4,986,220 A | * | 1/1991 | Reneau et al. | 119/57.91 |
| 5,233,941 A | * | 8/1993 | Ayliffe et al. | 119/57.91 |

* cited by examiner

Primary Examiner—Yvonne Abbott
(74) Attorney, Agent, or Firm—Joseph N. Breaux

(57) ABSTRACT

An animal feeder device that includes a bucket for holding a quantity of animal feed that is supported on four tubular angularly oriented legs that each include a feed passageway in connection with the bucket that terminates at a bottom end of the leg in a food discharge opening; each of the tubular angularly oriented legs being spaced an equal distance apart and being sized to allow gravity to gradually move feed from the bucket through each of the legs and out of the device through the feed discharge opening at the bottom of each leg.

1 Claim, 1 Drawing Sheet

ANIMAL FEEDER DEVICE

This application claims the benefit of provisional application No. 60/298,017, filed Jun. 12, 2001.

TECHNICAL FIELD

The present invention relates to animal feeder devices and more particularly to an animal feeder device that includes a bucket for holding a quantity of animal feed that is supported on four tubular angularly oriented legs that each include a feed passageway in connection with the bucket that terminates at a bottom end of the leg in a food discharge opening; each of the tubular angularly oriented legs being spaced an equal distance apart and being sized to allow gravity to gradually move feed from the bucket through each of the legs and out of the device through the feed discharge opening at the bottom of each leg.

BACKGROUND ART

It is often desirable to provide feed for animals in order to promote their health. Although, feeding animals can help promote their health, it is important that each of the animals has a opportunity to utilize the feed that is provided. It would be desirable, therefore, to have a feed device that included multiple paced feed discharge outlets so that dominant animals would not have the ability to prevent the less dominant animals from having their fair share of the feed.

GENERAL SUMMARY DISCUSSION OF INVENTION

It is thus an object of the invention to provide an animal feeder device that includes a bucket for holding a quantity of animal feed that is supported on four tubular angularly oriented legs that each include a feed passageway in connection with the bucket that terminates at a bottom end of the leg in a food discharge opening; each of the tubular angularly oriented legs being spaced an equal distance apart and being sized to allow gravity to gradually move feed from the bucket through each of the legs and out of the device through the feed discharge opening at the bottom of each leg.

Accordingly, an animal feeder device is provided. The animal feeder device includes a bucket for holding a quantity of animal feed that is supported on four tubular angularly oriented legs that each include a feed passageway in connection with the bucket that terminates at a bottom end of the leg in a food discharge opening; each of the tubular angularly oriented legs being spaced an equal distance apart and being sized to allow gravity to gradually move feed from the bucket through each of the legs and out of the device through the feed discharge opening at the bottom of each leg.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
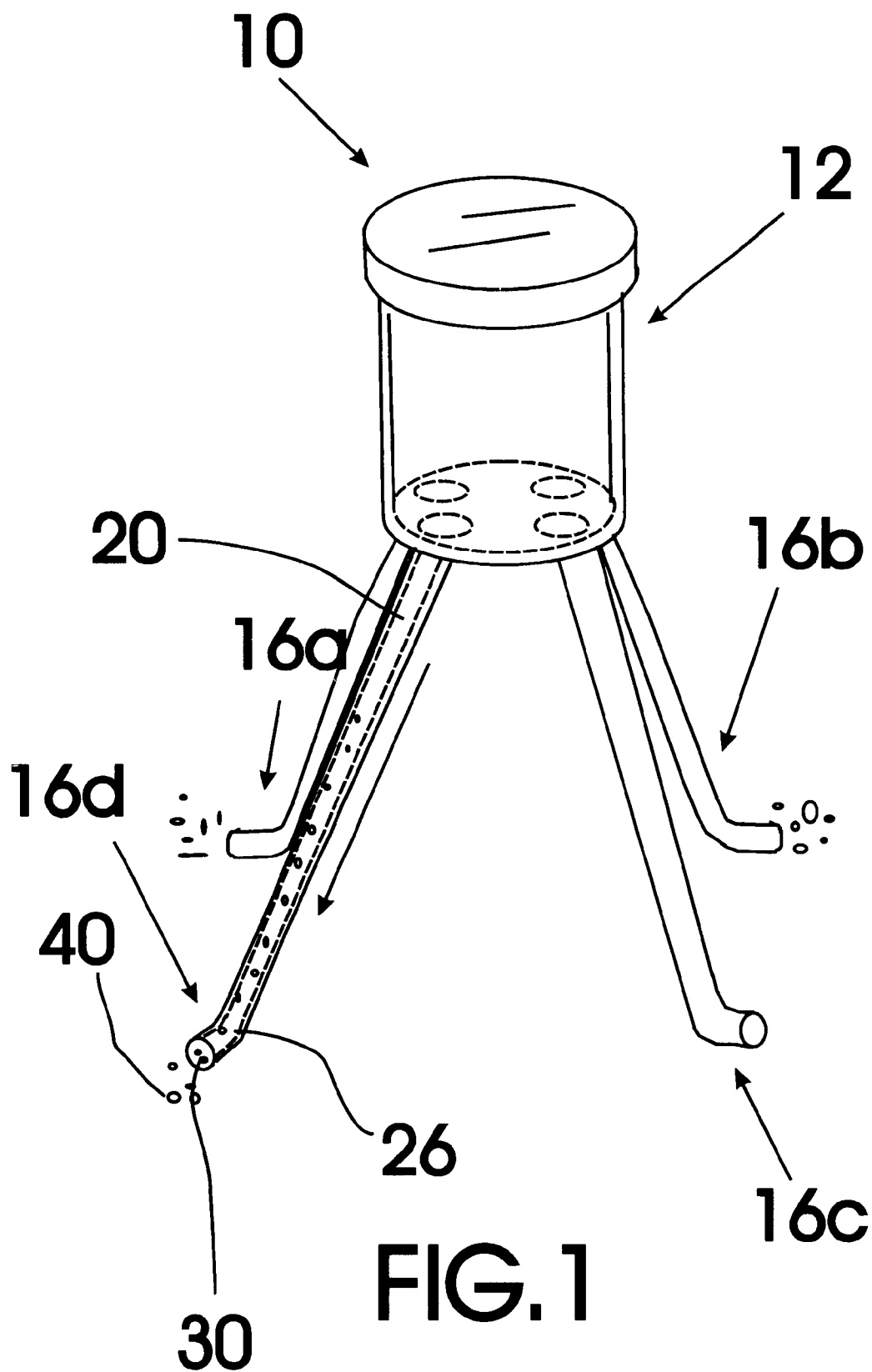
FIG. 1 is a perspective view of an exemplary embodiment of the animal feeder device of the present invention.

FIG. 1 shows various aspects of an exemplary embodiment of the animal feeder device of the present invention generally designated 10. Animal feeder device 10 includes a bucket 12 for holding a quantity of animal feed in an interior cavity 14 that is supported on four tubular angularly oriented legs 16a–d that each include a feed passageway 20 in connection with the cavity 14 of bucket 12 that terminates at a bottom end 26 of the leg 16a–d in a food discharge opening 30. Each of the tubular angularly oriented legs 16a–d is spaced an equal distance apart and is sized to allow gravity to gradually move feed 40 from the bucket 12 through each of the legs 16a–d and out of the device 10 through the feed discharge opening 30 at the bottom of each leg 16a–d.

It can be seen from the preceding description that an animal feeder device has been provided.

It is noted that the embodiment of the animal feeder device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:
1. An animal feeder device comprising:
   a bucket for holding a quantity of animal feed;
   four tubular angularly oriented legs supporting the bucket;
   each of the four tubular angularly oriented legs including a feed passageway along the length thereof in connection with the bucket at an upper end and in connection with a food discharge opening at a bottom end of the feed passageway;
   each of the tubular angularly oriented legs being spaced an equal distance apart;
   each of the feed passageways being sized to allow gravity to gradually move feed from the bucket through the feed passageway and out through the respective feed discharge opening at the bottom of the respective one of the four of the four tubular angularly oriented legs.

* * * * *